US006850932B2

(12) United States Patent
de Judicibus

(10) Patent No.: US 6,850,932 B2
(45) Date of Patent: Feb. 1, 2005

(54) METHOD, SYSTEM, AND PROGRAM FOR MERGING QUERY SEARCH RESULTS

(75) Inventor: Dario de Judicibus, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/449,134

(22) Filed: May 29, 2003

(65) Prior Publication Data

US 2003/0200206 A1 Oct. 23, 2003

Related U.S. Application Data

(62) Division of application No. 09/696,881, filed on Oct. 26, 2000, now Pat. No. 6,651,054.

(30) Foreign Application Priority Data

Oct. 30, 1999 (GB) .............................. 9925741

(51) Int. Cl.[7] .............................................. G06F 17/30
(52) U.S. Cl. ...................... 707/3; 707/4; 707/5; 707/6; 707/10
(58) Field of Search ............... 707/2, 3, 5, 6, 707/10, 4, 104

(56) References Cited

U.S. PATENT DOCUMENTS

| | | | | |
|---|---|---|---|---|
| 5,426,781 A | * | 6/1995 | Kaplan et al. .................. | 707/4 |
| 5,539,903 A | * | 7/1996 | Kaplan et al. .......... | 707/103 R |
| 5,630,122 A | * | 5/1997 | Kaplan et al. .................. | 707/4 |
| 5,710,900 A | * | 1/1998 | Anand et al. ................ | 345/764 |
| 5,721,901 A | * | 2/1998 | Banning et al. ................ | 707/4 |
| 5,845,278 A | * | 12/1998 | Kirsch et al. ................... | 707/3 |
| 5,852,823 A | * | 12/1998 | De Bonet ....................... | 707/6 |
| 5,899,999 A | * | 5/1999 | De Bonet ................ | 707/104.1 |
| 5,983,216 A | * | 11/1999 | Kirsch et al. ................... | 707/2 |
| 5,983,237 A | * | 11/1999 | Jain et al. ................ | 707/104.1 |
| 6,018,733 A | * | 1/2000 | Kirsch et al. ................... | 707/3 |
| 6,651,054 B1 | * | 11/2003 | de Judicibus .................. | 707/3 |
| 2001/0013036 A1 | * | 8/2001 | Judicibus ....................... | 707/5 |

OTHER PUBLICATIONS

Wu et al., "Shadow document methods of results merging", ACM, pp. 1067–1072, year 2004.*

Si et al., "A language modeling framework for resource selection and result merging", ACM, pp. 391–397, year 2002.*

Rasolofo et al., "Approaches to collection selection and results merging for distributed information retrieval" ACM, pp. 191–198, year 2001.*

Voorhees et al., "Multiple search engines in database merging", ACM, pp. 93–102, year 1997.*

Si et al., "Using sampled data and regression to merge search engine results", ACM, pp. 19–26, years 2002.*

Martinez, Michael J. "Web Goes Graphic. New Visual Interface Technology Dazzles Users." ABCNEWS.com [online] [retrieved on Sep. 17, 2002]. Retrieved from the Internet <URL:http//www.plumbdesign.com.

(List continued on next page.)

Primary Examiner—Jean M. Corrielus
(74) Attorney, Agent, or Firm—David W. Victor; Konrad, Raynes & Victor

(57) ABSTRACT

A system for interacting with a database report is disclosed. The database is responsive to a query to produce an associated report comprising one or more objects, each object comprising a plurality of attributes. The system comprises means for storing one or more reports from respective database queries; and means for rendering at least one object from the stored reports. A user interface enables a user to navigate through objects composing the stored reports to select an object; select one or more attributes of the selected object and determine a value of a selected attribute to be used as a condition in a subsequent database query. A query generator receives the selected attribute values and generates the subsequent database query.

37 Claims, 5 Drawing Sheets

OTHER PUBLICATIONS

"Web Sightings. An Idiosyncratic List of Some of our Favorite On–line Haunts." The New Yorker, May 29, 2000 [online], [retrieved on Sep. 17, 2002]. Retrieved from the Internet <URL:http://www. plumbdesign.com.

Mirapaul, Matthew. "Choose a Word and Float and Idea." The New York Times, Mar. 12, 1998 [online] [retrieved on Sep. 17, 2002]. Retrieved from the Internet <URL "http://www.plumbdesign.com.

* cited by examiner

FIG. 5

| Person | Number | Department | Age | Sex | IT Skill | Position | Security | Seniority |
|---|---|---|---|---|---|---|---|---|
| Ravelli, Maria | 5-769 | G1F096D | 27 | F | 4 | Specialist | 3 | 5 |
| Curtis, Peter | 8-709 | G1Y123H | 32 | M | 3 | Specialist | 4 | 8 |
| Enomoto, Ichi | 5-008 | G9T012K | 41 | M | 5 | Architect | 5 | 12 |
| Shultz, Marcus | 2-186 | S2T056L | 36 | M | 3 | Manager | 5 | 9 |

FIG. 6

| Person | Number | Department | Age | Sex | IT Skill | Position | Security | Seniority |
|---|---|---|---|---|---|---|---|---|
| Ravelli, Maria | 5-769 | G1F096D | 27 | F | 4 | Specialist | 3 | 5 |
| Martin, Pierre | 8-712 | G1Y123H | 51 | M | 2 | Manager | 5 | 22 |
| Enomoto, Ichi | 5-008 | G9T012K | 41 | M | 5 | Architect | 5 | 12 |
| Shultz, Marcus | 2-186 | S2T056L | 36 | M | 3 | Manager | 5 | 9 |

METHOD, SYSTEM, AND PROGRAM FOR MERGING QUERY SEARCH RESULTS

CROSS-REFERENCE TO RELATED APPLICATIONS

This patent application is a divisional application of and claims priority to and commonly-assigned application Ser. No. 09/696,881, now U.S. Pat. No. 6,651,054 titled "METHOD, SYSTEM, AND PROGRAM FOR MERGING QUERY SEARCH RESULTS," filed on Oct. 26, 2000, by Dario de Judicibus, which patent application claims priority from the commonly assigned United Kingdom Patent Application entitled "Interaction With Database Reports", having United Kingdom Patent Application Serial No. 9925741.2, filed on Oct. 30, 1999, by Dario de Judicibus, each of which is incorporated herein by reference in its entirety.

1. FIELD OF INVENTION

The present invention relates to a system cooperable with a database which allows a user to interact with a database report to refine a database query.

2. BACKGROUND OF THE INVENTION

A database can be considered as a multidimensional space (mD-space) where each axis corresponds to an attribute and each object occupies a point in that space. Attribute values may be finite or infinite; continuous, discrete ordinal or discrete nominal. Take, for example, an object 10 as shown in FIG. 1, where each vertex 12 represents one of five attributes. In this case, the object has a value for each attribute, as shown by the lines 14 linking the object to each of its attribute values. However, it should be seen that objects need not be valued for all attributes and this can be represented by omitting a line 14 for such null attributes.

Conventional relational databases store information in a plurality of tables (relations) with each table containing one or more objects and each object containing one or more attributes. Selecting objects in a database corresponds to identifying a subset of objects in the mD-space by specifying one or more conditions within a query. A common form of specifying a query on such databases employs a Structured Query Language (SQL). SQL queries generally take the form:

Select Attributes from Relations where Conditions

Where a database comprises many tables linked together through a complex network of index fields, a database query may become quite complex involving, for example, INNER-JOIN expressions. Often applications which link to databases do not expose a user to having to specify a complete SQL query, rather they take input from the user in a simple manner, for example, getting the name of the person they wish to find using a text entry field. This Condition is then inserted into a query where the Attributes which are to form the resultant report and the Relations from which information is drawn for the query are pre-defined by a programmer.

The resultant report is itself usually a relation, again comprising a number of objects conforming to the conditions and having the attributes specified in the query. The relation is then rendered so that it can be displayed on the screen in a suitable manner for example as a table or as a graph.

The resultant report can be thought of as a notional curve in the mD-space connecting all the objects $10_1 \ldots 10_z$ belonging to the subset identified by the query, FIG. 2, and moving through the report is equivalent to navigating along that curve. Nonetheless, because the report is static, should the user not find the required information, they must backtrack to amend the original query before being presented with a new report.

It will be seen, however, that the user often does not have all the right information to define the best possible query initially. Thus, the user submits a query, looks at the results, modifies the query, gets the new result, and so forth. So, to get closer to the desired result requires resubmitting another query which means losing time and it also means that both the original query and the original report are lost.

Query-by-Example (QBE) is a well known method for constructing a database query graphically, again removing the user from needing to learn and write SQL. Using QBE, a user essentially draws an example table comprising the attributes involved in the query and sets attribute values according to the required conditions. The example table is then analyzed, a structured query generated and fed to the database to produce a report.

It is known using a QBE interface to take a report resulting from a first query and use this report in turn as an input for generating a second or subsequent query, for example, Information Server produced by Verity, Inc. For more information see "verity.com". Each subsequent report, however, still replaces a both previous query and its associated report when generating a new report.

An attempt to move within the results of one query to form another query has been proposed in a visual thesaurus produced by Plumb Design, Inc. For more information see "plumbdesign.com/thesaurus/". It should be seen, however, that in this case that the report only includes one and only one attribute type, ie synonym, and the query one and only one condition, ie the search word.

It is an object of the present invention, to enable a user to locally move around a specific object in a multi-attribute type database space, according to one or more selected conditions, to provide fine tuning of the result obtained in a report.

SUMMARY OF THE PREFERRED EMBODIMENTS

Accordingly, the present invention provides a system cooperable with a database which allows a user to interact with a database report to refine a database query according to a system cooperable with a database which is responsive to a query to produce an associated report comprising one or more objects, each object comprising a plurality of attributes, said system comprising: means for storing one or more reports from respective database queries; means for rendering at least one object from said stored reports; means, responsive to user interaction, for navigating through objects composing said stored reports to select an object; means, responsive to user interaction, for selecting one or more attributes of said selected object; means, responsive to user interaction, for determining a value of a selected attribute to be used as a condition in a subsequent database query; and means, responsive to said selected attribute values, for generating said subsequent database query.

The preferred embodiments allow a user to select an object in the database space laying on a report curve, and allows the user to move directly from there in the database space, without requiring the user to submit another query to create another curve in that space.

BRIEF DESCRIPTION OF THE DRAWINGS

Preferred embodiments are described with reference to the accompanying drawings, in which:

FIGS. 5 and 6 illustrate the display rendered by a first embodiment of a renderer component of the system according to the preferred embodiments;

DESCRIPTION OF THE PREFERRED EMBODIMENTS

Figure 3:
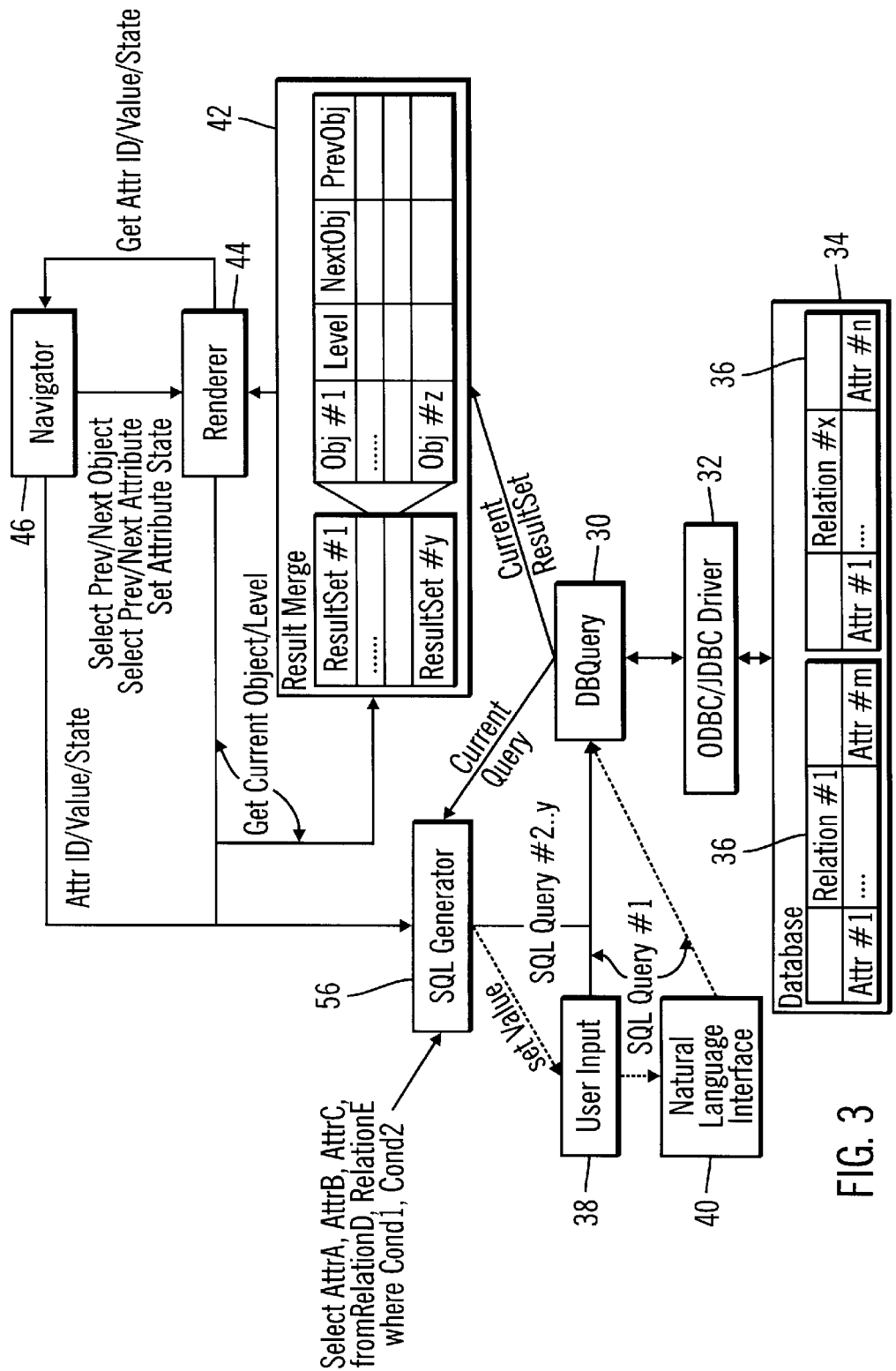
FIG. 3 is a block diagram of a system according to the invention.

Referring now to FIG. 3 which shows a block diagram of a system enabling a user to interact with a database report and so refine a query according to a preferred embodiment of the invention. This embodiment is described for simplicity in terms of Java Beans, although it will be seen that the invention is not limited to this nor indeed object oriented languages in general nor strictly to the structure shown.

In describing the operation of the system, for clarity, reference will be made to the operation of classes whereas it is to be understood that it is instances of such classes which execute at run time.

UK Application No. GB9814339.9 and corresponding U.S. application Ser. No. 09/342,775, now U.S. Pat. No. 6,441,541, which applications are incorporated herein by reference in their entirety, describe a set of Java beans one of which, DBQuery 30, connects via a database driver 32 to a relational database 34. The relational database 34 comprises a plurality of tables 36, Relation #1 . . . #x, each of which store a number of attributes for a number of objects.

DBQuery 30 comprises a number of properties including the address and type of the database and any username and password required to access the database 34. From the point of view of the present invention, two properties are relevant: Query and DBResultSet. DBQuery 30 also exposes get and set methods enabling its properties to be read and, where possible, written by other objects.

In the present embodiment, a text entry field 38 receives user input directly defining an initial SQL query—SQL Query #1. Where the user is not expected to be familiar with such query languages, user input can be via a natural language interface 40, which receives input, for example, "Get me all red 4 wheel drive cars in your catalogue", and converts this to an initial SQL query.

Again, it should be seen that the present embodiment is described in relation to SQL and relational databases for exemplary purposes only, and it will be seen that the invention is applicable to any means for querying any database. For example, initial input could be made from a QBE type interface or indeed initial input might be limited to only specifying conditions for a limited number of attributes with the remainder of the query being pre-defined or built automatically.

In any case, initial user input 38 is used to set the Query attribute of DBQuery 30. This causes DBQuery 30 to link to the database 34 and generate a report which is returned as DBResultSet. A results merging object 42 listens for changes in DBResultSet. In response to an initial query causing a change in DBResultSet, the results merging object 42 simply stores DBResultSet and calculates a number of additional attributes for each object of the result set. In this case, because the result set is from an initial query, a level attribute for each object is set to 1. Each object also forms part of a doubly linked chain having a NextObj and PrevObj attribute pointing to the next and previous objects in the result set.

A renderer 44 is connected to the results merging object 42. The renderer 44 also listens for changes either in DBResultSet within DBQuery 30 or in the merged results within the results merging object 42. Responsive to such changes the renderer re-displays the merged results set.

Figure 7:
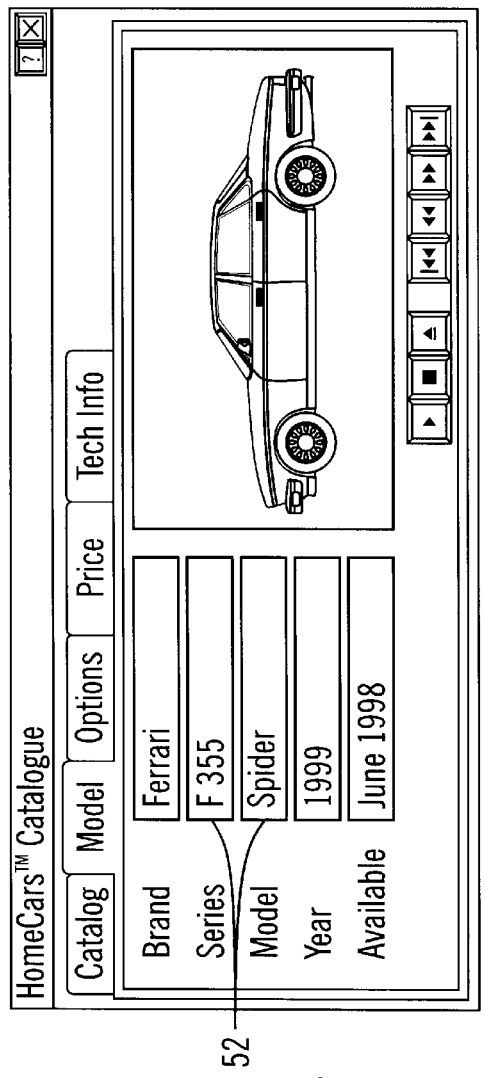
FIGS. 7 and 8 illustrate the display rendered by a second embodiment of a renderer component of the system according to the preferred embodiments.

In a first embodiment, FIG. 5, the result set is displayed as a table; and in a second embodiment, FIG. 7, where one of the attributes is a multimedia video, the display is more dedicated, where the attributes are displayed across a number of tabbed pages—Catalog, Model, Options etc. In the first embodiment, all objects from the initial result set are displayed simultaneously, whereas in the second embodiment only one object at a time is displayed. It will be seen that an almost infinite number of ways of rendering the result set can be used, and in another example, the paradigm of FIG. 1 can also be used to display result set objects one at a time.

A navigator 46 is cooperable with the renderer 44. It assumes that the renderer 44 implements an interface whereby the navigator, in response to user interaction, can cause the renderer to: select any, the previous or next object; select any, the previous or next attribute within an object; and to set a selected object's selected attribute state, as will be explained later.

In the first renderer embodiment, the navigator is not visible at run time, and the user appears to interact directly with the displayed table. This may mean that the renderer, which occupies the area of the display with which the user interacts, needs to be adapted to relay user keystrokes and mouse movement to the navigator which in turn processes these interactions as if the navigator were receiving interaction directly. In any case, the navigator 46 is responsive to the user moving the up and down cursor keys to select the previous and next objects and moving the left and right cursor keys to select the previous and next objects. (Where the first or last objects or attributes are already selected, the renderer can either wrap around or remain at the selected object/attribute.) The user can also move the mouse and randomly, rather than sequentially, select objects and attributes. In any case, the selected object attribute is appropriately highlighted by the renderer 44 to provide feedback to the user.

Figure 10:
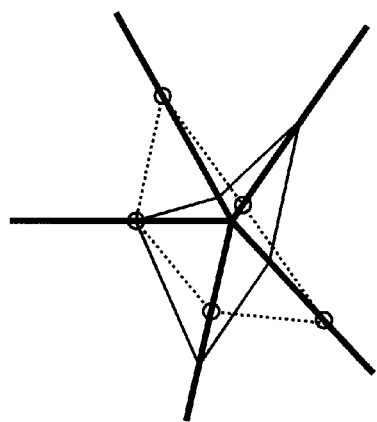
FIG. 10 illustrates a number of objects in multi-dimensional space.
Figure 2:
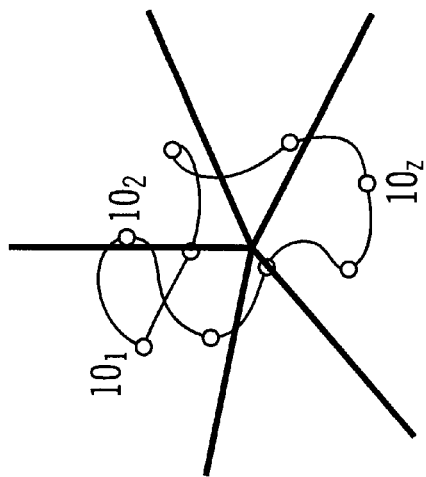
FIG. 2 illustrates a number of such objects in multi-dimensional space linked by a notional curve.
Figure 1:
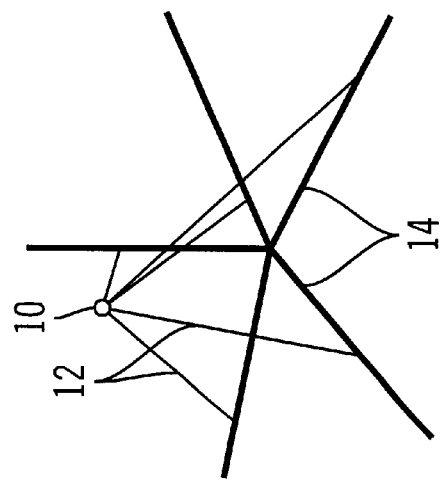
FIG. 1 illustrates an object in multidimensional space.

In the second embodiment, FIG. 7, the navigator appears as a tool bar 50 within (or adjacent) the rendered display. By selecting the arrows of the tool bar 50, the renderer is caused to display the attributes of the first, previous, next or last result set object respectively. (The buttons 51 are used to play the multimedia video of the car.) The user may also select either the displayed entry fields 52, the display area 54 for the video, or move between tabbed pages to select other attributes.

Where a renderer 44 uses the paradigm of FIG. 1, arrow buttons (not shown) such as those of FIGS. 7 and 8, can again be used to cause the renderer to display any object in the manner shown. Again either cursor movement or mouse selection can be used to select a vertex 12 and move between vertices, with the selected vertex being highlighted as appropriate.

In any case, the user may now decide to refine the search. In the case of FIG. 5, the user is looking for a person in their company who has specific characteristics. The user first defines a query including the conditions related to the characteristics they are looking for. The user may also define the attributes needed to contact that person to be included in the report or these may be pre-defined. Where a natural language interface is used, the query might be of the form:

Look for all people in any department
with an IT skill equal or greater than 3,
a security level greater than 2,
and employed by at least 5 years in our company
and the report would be as shown in FIG. 5.

Now, since security is more important to this user than IT skill, it looks like Peter Curtis is the person needed. Typically, the user tries to contact him by phone at tie-line 8709 but he doesn't answer. The user therefore needs to contact another person this department hoping he or she may be able to help. In a conventional system, the user has to submit another query, of the form:

Look for all people in department G1Y123H
and a security level greater than 2

By doing this, however, both the original query and its result are lost, or the user needs to open another window which in turn might be slow. Furthermore, if the people found in the second search are not helpful, the user needs to repeat the whole process for another candidate, for example Maria Ravelli.

In the first embodiment, however, the user simply selects Peter Curtis inside the rendered report itself, and then selects the Department attribute as explained above. The navigator is then further responsive either to a designated keystroke or to a mouse button being pressed to change the state of the selected object's selected attribute. This state change is indicated by highlighting the locked attribute, in this case with a lock icon 60, to indicate the user has locked this attribute. This locking is communicated between the navigator 46 and an SQL generator 56, FIG. 3, by transmitting the attribute identity, its value and optionally its state, in this case "locked".

By extending the navigator interface to read user keyboard input when an attribute has been selected, the attribute value for the locked attribute can be input directly and so can be adjusted away from the object's attribute value in the result set before being communicated to the SQL generator 56. (This is course does not actually change the attribute value stored within the result merging object 42.

The user continues by selecting the Security attribute. Again, the navigator responds either to a designated keystroke or to a mouse button being pressed to change the state of security attribute. In this case, the user "conditionally locks" this attribute, that is the user wishes to use the same criterion for this attribute as in the query associated with the selected object. The conditional locking is highlighted with a differently coloured lock icon 62, although it should be seen that any suitable highlighting mechanism can be used. This conditional locking is again communicated between the navigator 46 and the SQL generator 56 by transmitting the attribute identity, optionally its value and optionally its state, in this case "conditionally locked". (If only the identity is transmitted, then the SQL generator will know a conditional lock has been set.)

It will be seen that if the attribute selected for conditional locking is not a condition of the original query, then conditional locking will not be possible and an indication of such needs to be provided to the user.

Note that the user does not need to specify again that security must be greater than 2, but the conditional lock is a lock on a previous condition, whereas a simple lock is an explicit lock on a value.

In this example, the user now strikes a key or clicks a mouse button to cause the navigator 46 to in turn cause the SQL generator 56 to generate the next query. The SQL generator 56 also listens for changes in the Query property of DBQuery and so remembers the initial and any subsequent queries, FIG. 3. As can be seen, each query comprises a specified set of attributes, relations and conditions. In the present embodiment, it is only the conditions that are changed from query to query. That, is the axes of the multi-dimensional space are not affected, although it will be seen that by extending the navigator interface and the capability of the result merging object 42, it is possible to enable the user to both add or subtract attributes from query to query.

In the example, the SQL generator 56 generates the next query by using the explicit condition provided for the Department attribute and by obtaining the previously provided condition for the Security attribute. This query is used to set the query attribute of DBQuery, which in turn produces another result set. The SQL generator may also use the query to set a new value for the text entry field 38, so confirming to the user the conditions used in the new query and perhaps teaching the user how to formulate better or more sophisticated initial queries.

The results merger object 42 detects the new result set and adds it to its internal store of result sets. The results merger object 42 knows the currently selected object and finds the object which pointed to this object as its next object. The next object pointer of this object is then changed to the first object of the new result set. The next object pointer of the last object of the new result is also set to the next object pointer of the currently selected object and corresponding changes are made to the previous pointers of the first object of the new result set and the object which followed the currently selected object to generate a combine result set in which the new result set is linked. As the currently selected object had a level of 1, the level for each object of the new result set is set at 2. Finally, the currently selected object is set as the first object of the new result set. (It should be seen that the result merging object 42 could avoid using extra linking attributes by reorganising its stored objects into a navigation sequence.)

In this example, the Peter Curtis object has been dropped from the list, although it will be seen that it is possible to include the new result set after the currently selected object and so retain this object within the combined result set.

Figure 4:
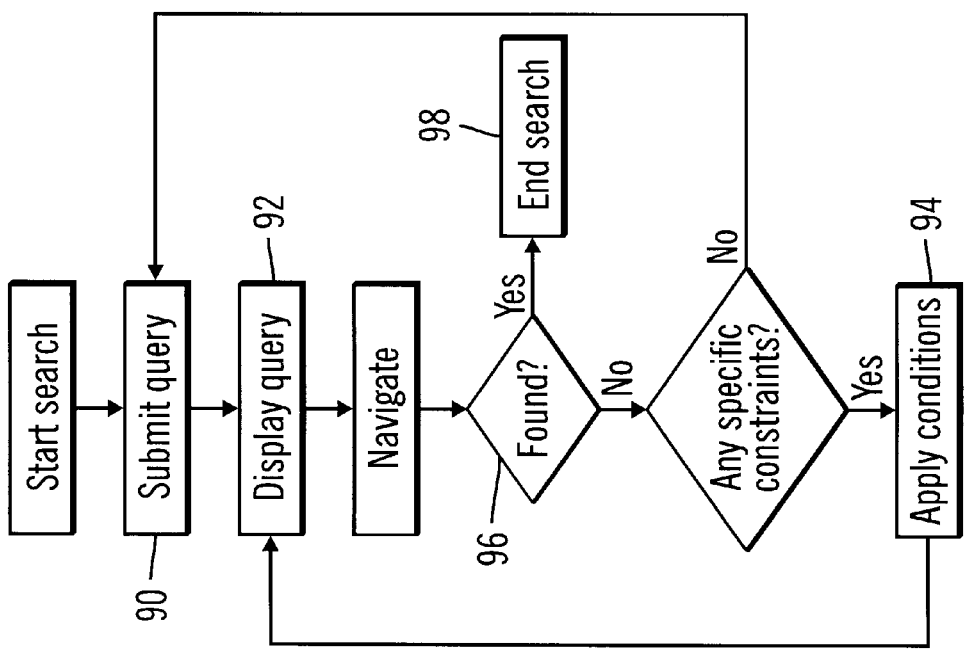
FIG. 4 is a flow diagram illustrating the general operation of the system of FIG. 3.

The renderer 44 again detects the new result set and now re-renders the combined result set, FIG. 4. In the present example, only one object from result sets having levels greater than 1 is displayed. So the renderer displays all level 1 objects, and as soon as it detects a level 2 object (it skips the Peter Curtis object), it highlights this object with a bounding box and a spin button 58 is displayed beside this object. The renderer continues until it detects the next level 1 object and displays this and all subsequent level 1 objects until either a level 2 object is detected or no more objects remain. If within a sequence of level 2 objects, the renderer detects a level 3 object, then this will be displayed in preference to the previously displayed level 2 object, and so on for further level results sets which have been generated from result sets one level higher.

Once the result set is rendered, the navigator is responsive to the user selecting the arrows of the spin button 58 to sequentially display within the bounding box, the objects of the result set from which the displayed object was drawn. When the user is at the first or last object of a lower level result set, then the renderer goes to the upper or lower level and allows the user to traverse this result set. (Alternatively, the renderer can be set to wrap around this result set.)

Figure 9:
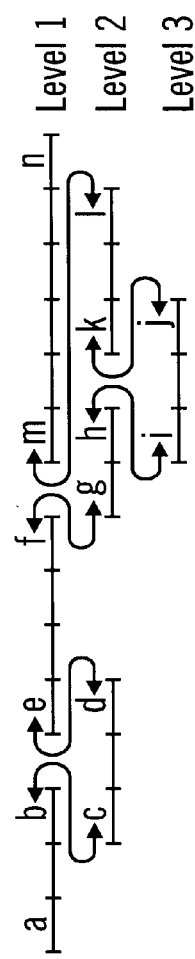
FIG. 9 illustrates the operating sequence and typical navigation path.

FIGS. 4 and 9 illustrate the operating sequence and typical navigation path. In this case, the user has submitted an initial query, step 90, resulting in objects a . . . n. The result set is displayed, step 92, and the user navigated to an object between objects b and e where one or more conditions were then set, step 94, resulting in a second result set comprising objects c to d. Again the results were displayed and the user then navigated to an object between objects f and m where further conditions were set resulting in a third result set comprising objects g to l. In the first embodiment, only the currently selected object from within this third result set is displayed between objects f and m. The user then sets a further condition on an object of the third result set between objects h and k, to generate a fourth result set comprising objects i to j. When the user is traversing the fourth result set, only the currently selected object from this set will be displayed between objects f and m, until the user navigates to either of objects h or k which will then be displayed between objects f and m. If at any time the user finds the desired object, step 96, the search can end, step 98. Alternatively, if the rendered attributes need to be changed, the user can re-formulate the query completely, by returning to step 90. Nonetheless, as mentioned earlier, the navigator user interface can be extended so that at step 94, the user can add or delete attributes from a query without having to return to step 90, and so losing all previous result sets generated from the initial query.

In this manner, the user navigates along a virtual path corresponding to any query without losing the results of any query. From the point of view of the multidimensional space, it is like the user is moving in a region around a specific object by fixing or conditioning one or more axis values for attributes. Even if the user does not fix or constrain the navigation, this mechanism allows the user to move within a set of objects close to the selected one. If the metric of the space is defined so that objects that are close to each other are logically related, then this mechanism allows the user to look at similar entries in the database without resubmitting a query.

Figure 8:
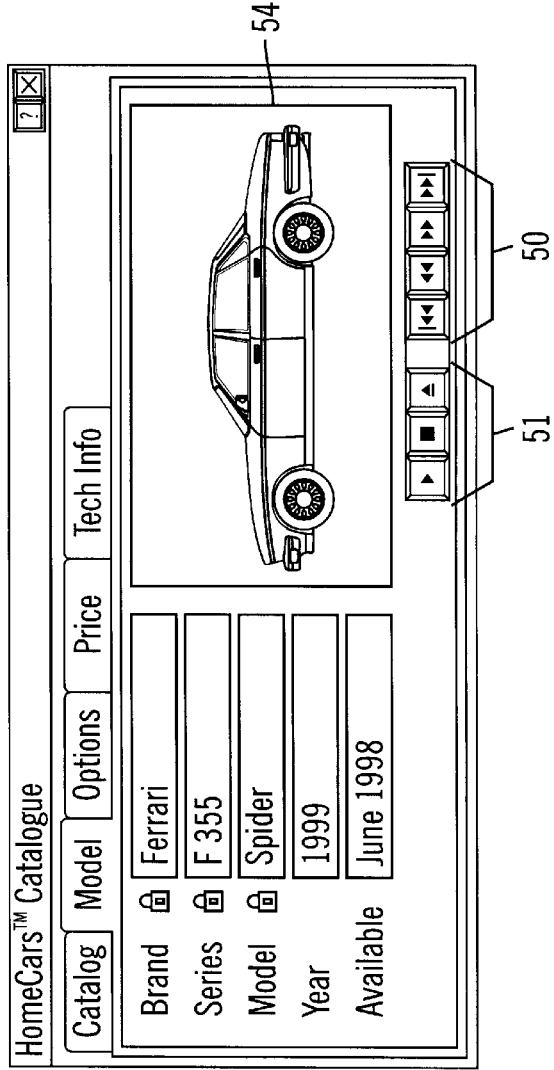

The invention is particularly useful if the user is working with a database containing multimedia data. In the embodiment of FIGS. 7 and 8 the user is searching a catalogue of cars for a red sports car. The user does not have a specific brand in mind, nor a model. Again using a natural language interface the following query might be submitted:

Look for all cars of any brand

With sporting special-body and whose colour is any tonality of red.

The first result set comprises a number of objects and the user navigates through the various objects to look at the selected car models. Now, the user realises they like a model, but wishes to look at others colours too, and possibly also variants due to optional features. So the user locks the brand, the series and the model, and uses the mouse to navigate around the selected featured car to look at variants.

Note that in this case, even if colours and options information is available from other tabbed panels that are not currently visible, the user can move to other objects from the "Model" panel. The user does not have to move to the "Options" panel to select a different colour or other specific options.

In the embodiments, the navigator 46 has been shown separately from the renderer 44 to illustrate that the invention is independent of the type of renderer and navigator used. As mentioned previously, a third form of renderer is shown in FIG. 1. The renderer can be used in conjunction with a navigator of the type used with the second embodiment, where again only one object is displayed at a time. Again selecting first, previous, next or last object causes the object to be displayed with vertices 14 linking a point to the attribute values for the object. A default selected attribute is indicated by highlighting its associated vertex 12. The user can select other attributes directly using the mouse or by striking designated functions keys. When the user wishes to condition a query, a mouse button or function key can be used to indicate a lock or conditional lock. Again in this case, the navigator interface can be extended to allow the user to click and drag along a selected vertex so that the attribute value for the locked attribute can be adjusted away from the object's attribute value in the result set.

In a variation of the renderer paradigm of FIG. 1, more than one object can be displayed at the same time, by distinguishing between respective object's attribute values. In this case, distinctive lines and markers are used to distinguish different objects. Such a display may be confusing where many objects are displayed and so might preferably be used alternatively or in conjunction with the renderer of FIG. 1.

Notwithstanding the above renderer examples, it should be seen that the navigator and renderer can be implemented as a single class especially where the functionality of the two are more interdependent.

It will therefore be seen that the invention allows a user to navigate inside a database even when the user does not have specific and well-defined criteria for searching. That is, it allows the user to find objects by an heuristic approach, starting navigation from an object that approximately matches user's requirements, and moving a little bit around that object to capture similar objects. As the user finds objects that look satisfactory, they are added to a "basket" and with the user continuing their search. This approach is very useful in analysis, data mining, investigations, simulations, and other computer assisted activities where it is not possible to specify "a priori" a clear set of requirements but the final result is the consequence of a continuous interaction between the user and the machine.

It is noted that SQL has been further developed into SQL3. SQL3 includes objects extensions where, in addition to the normal simple built-in types defined by SQL, complex user-defined types may also be defined, and these types may be used in the same way as built-in types. For example, columns in relational tables may be defined as taking values of user-defined types, as well as built-in types. The invention is therefore not limited to databases in which attributes contain simple data types.

What is claimed is:

1. A system cooperable with a database which is responsive to a query to produce an associated report comprising one or more objects, each object comprising a plurality of attributes, said system comprising:

means for storing one or more reports from respective database queries;

means, responsive to user interaction, for navigating through objects composing said stored reports to select an object;

means, responsive to user interaction, for selecting one or more attributes of said selected object;

means, responsive to user interaction, for determining a value of a selected attribute to be used as a condition in a subsequent database query; and means, responsive to said selected attribute values, for generating said subsequent database query.

2. The system of claim 1, means for rendering at least one object from said stored reports.

3. A system as claimed in claim 2, wherein said determining means is responsive to a third user interaction to determine an adjusted value of said selected object's selected attribute's stored value as said condition.

4. A system as claimed in claim 2, wherein said renderer means is adapted to display only a selected object.

5. A system as claimed in claim 2, wherein said renderer means is adapted to initially display all objects from a stored report associated with a first query.

6. A system as claimed in claim 5, wherein said renderer means is adapted to display a selected object from a subsequent report in place of the object from the stored report associated with the first query from which the conditions of the subsequent associated query were determined.

7. A system as claimed in claim 5 wherein said renderer means is adapted to display all objects from subsequent reports in place of the objects from stored reports associated with the previous queries from which the conditions of the subsequent associated queries were determined.

8. A system as claimed in claim 1 wherein said determining means is responsive to a first user interaction to determine said selected object's selected attribute's stored value as said condition.

9. A system as claimed in claim 1 wherein said determining means is responsive to a second user interaction to determine said selected object's attribute's value in the query associated with object as said condition.

10. A system as claimed in claim 1 wherein said renderer is adapted to display said objects in a table.

11. A system as claimed in claim 1 wherein said storing means is adapted to combine the objects from subsequent reports into a list of objects to be navigated by said user.

12. A system as claimed in claim 1 wherein said navigation means is adapted to navigate to the first, previous, next or last object in said list.

13. A system as claimed in claim 1 comprising means for receiving user input corresponding to at least a portion of a first query.

14. A system as claimed in claim 13 wherein said receiving means comprises one of a natural language interface, a text entry field or a query-by-example analyzer.

15. A computer program product comprising computer program code stored on a computer readable storage medium for, when executed on a computing device, interacting with a database report, the program code comprising the system of claim 1.

16. A method operable with a database which is responsive to a query to produce an associated report comprising one or more objects, each object comprising a plurality of attributes, the method comprising the steps of:
    storing one or more reports from respective database queries;
    responsive to user interaction, navigating through objects composing said stored reports to select an object;
    responsive to user interaction, selecting one or more attributes of said selected object;
    responsive to user interaction, determining a value of a selected attribute to be used as a condition in a subsequent database query; and
    responsive to said selected attribute values, generating said subsequent database query.

17. The method of claim 16, further comprising rendering at least one object from said stored reports.

18. The method of claim 17, wherein said rendering is adapted to display only a selected object.

19. The method of claim 17, wherein said rendering is adapted to initially display all objects from a stored report associated with a first query.

20. The method of claim 19, wherein said rendering is adapted to display a selected object from a subsequent report in place of the object from the stored report associated with the first query from which the conditions of the subsequent associated query were determined.

21. The method of claim 19, wherein said rendering is adapted to display all objects from subsequent reports in place of the objects from stored reports associated with the previous queries from which the conditions of the subsequent associated queries were determined.

22. The method of claim 16, wherein determining said value of said selected attribute used as a condition in a subsequent query is responsive to a subsequent user interaction to perform a subsequent determination of said selected object's selected attribute's stored value as said condition.

23. The method of claim 16, wherein storing one or more ports further comprises combining the objects from subsequent reports into a list of objects to be navigated by said user.

24. The method of claim 16, wherein navigating through objects composing said reports further comprises navigating to the first, previous, next or last object in said list.

25. The method of claim 16, further comprising receiving user input corresponding to at least a portion of a first query.

26. The method of claim 25, wherein receiving user input comprises receiving one of a natural language interface, a text entry field or a query-by-example analyzer.

27. A program operable with a database which is responsive to a query to produce an associated report comprising one or more objects, each object comprising a plurality of attributes, wherein the program is embedded in a computer readable medium and capable of causing a processor to perform:
    storing one or more reports from respective database queries;
    responsive to user interaction, navigating through objects composing said stored reports to select an object;
    responsive to user interaction, selecting one or more attributes of said selected object;
    responsive to user interaction, determining a value of a selected attribute to be used as a condition in a subsequent database query; and
    responsive to said selected attribute values, generating said subsequent database query.

28. The program of claim 27, wherein the program is further capable of causing the processor to perform rendering at least one object from said stored reports.

29. The program of claim 28, wherein said rendering is adapted to display only a selected object.

30. The program of claim 28, wherein said rendering is adapted to initially display all objects from a stored report associated with a first query.

31. The program of claim 30, wherein said rendering is adapted to display a selected object from a subsequent report in place of the object from the stored report associated with the first query from which the conditions of the subsequent associated query were determined.

32. The program of claim 30, wherein said rendering is adapted to display all objects from subsequent reports in place of the objects from stored reports associated with the previous queries from which the conditions of the subsequent associated queries were determined.

33. The program of claim 27, wherein determining said value of said selected attribute used as a condition in a subsequent query is responsive to a subsequent user interaction to perform a subsequent determination of said selected object's selected attribute's stored value as said condition.

34. The program of claim 27, wherein storing one or more ports further comprises combining the objects from subsequent reports into a list of objects to be navigated by said user.

35. The program of claim 27, wherein navigating through objects composing said reports further comprises navigating to the first, previous, next or last object in said list.

36. The program of claim 27, further comprising receiving user input corresponding to at least a portion of a first query.

37. The program of claim 36, wherein receiving user input comprises receiving one of a natural language interface, a text entry field or a query-by-example analyzer.

* * * * *